United States Patent [19]

Bindra

[11] Patent Number: 5,747,571
[45] Date of Patent: May 5, 1998

[54] HEAT STABLE MONOAZO RED PIGMENT COMPOSITIONS

[75] Inventor: Amrit Bindra, Brecksville, Ohio

[73] Assignee: Engelhard Corporation, Iselin, N.J.

[21] Appl. No.: 856,220

[22] Filed: May 14, 1997

Related U.S. Application Data

[62] Division of Ser. No. 718,851, Sep. 24, 1996, Pat. No. 5,677,435.

[51] Int. Cl.$^6$ .......................... C09D 11/00; C09B 63/00; C08K 5/23
[52] U.S. Cl. .............. 524/190; 106/31.8; 106/402; 106/494; 106/496
[58] Field of Search .......................... 106/402, 494, 106/496, 31.8; 524/190

[56] References Cited

U.S. PATENT DOCUMENTS

| | | | |
|---|---|---|---|
| 3,519,617 | 7/1970 | Rast et al. | 534/883 |
| 4,014,866 | 3/1977 | Henning | 534/884 |
| 4,143,036 | 3/1979 | Stefancsik | 534/874 |
| 4,719,292 | 1/1988 | Schui et al. | 534/575 |
| 5,084,106 | 1/1992 | Kobayashi et al. | 106/402 |
| 5,102,466 | 4/1992 | Mordente et al. | 106/496 |

OTHER PUBLICATIONS

Colour Index International CD-ROM, 3rd Edition, 1995, C.I. Generic Name:C.I. Pigment Red 108, C.I. Constitution No. 77202; Commercial Name: Cadmium Bright Red CC-6325.

Colour Index International, CD-ROM, 3rd Edition, 1995, C.I. Generic Name: C.I. Pigment Red 254, C.I. Constitution No. 56110, Commercial Name: Cromophtal DPP Red BP.

Colour Index International CD-ROM, 3rd Edition, 1995, C.I. Generic Name: C.I. Pigment Red 255, Commercial Name: Irgazin DPP Red 5G.

Colour Index International CD-ROM, 3rd Edition, 1995, C.I. Generic Name: C.I. Pigment Red 53:1, C.I. Constitution No. 15585:1, Commercial Name: Bronze Scarlet CT 510.

Shukutani et al., Chemical Abstracts, 126:105567 (1996).

*Primary Examiner*—Fiona T. Powers
*Attorney, Agent, or Firm*—Raymond F. Keller

[57] ABSTRACT

Disclosed are compositions comprising one or more compounds characterized by the formula:

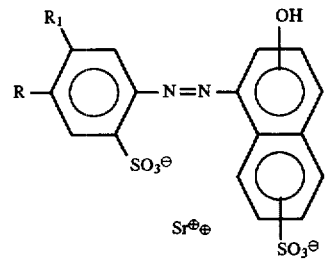

wherein R and $R_1$ are independently hydrogen, chloro, methyl or ethyl groups.

A process for preparing azo pigment compositions is also disclosed.

Paint, ink and plastic compositions containing the foregoing pigments compositions are disclosed.

20 Claims, No Drawings

HEAT STABLE MONOAZO RED PIGMENT COMPOSITIONS

This application is a Division of application Ser. No. 08/718,851 filed Sep. 24, 1996, now U.S. Pat. No. 5,677,435.

BACKGROUND OF THE INVENTION

1. Field of the Invention

This invention relates to novel azo red pigments, processes for their preparation and to paint, plastic and ink compositions containing such pigments.

2. Description of Related Art

Commercially available red pigments commonly used in plastics include such pigments as Colour Index (C.I.) Pigment Red 108, Pigment Red 254, Pigment Red 255 and Pigment Red 53:1.

Pigment Red 108 is a cadmium sulfoselenide pigment which is, of course, less than desirable because it contains cadmium.

Pigment Red 254 is represented by the formula:

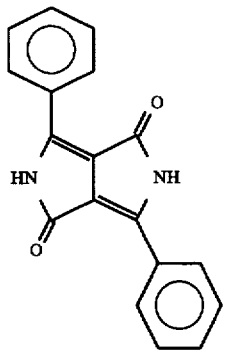

Pigment Red 255 is an organic pigment having a formula similar to that of Pigment Red 254 but its exact formula is not known. Pigment Red 254 and 255 are relatively expensive and lower cost replacements are desired.

Pigment Red 53:1 is represented by the formula:

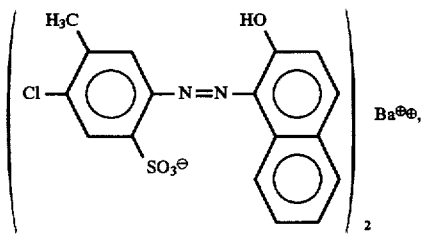

which is less than desirable because it contains barium.

Consequently, there is still a need for red pigments without these deficiencies that show performance in properties such as color strength, resistance to polar solvents, light fastness and/or heat stability.

SUMMARY OF THE INVENTION

This invention relates to red pigments suitable for use as coloring agents, and processes for their preparation.

In one embodiment, this invention relates to a composition comprising one or more compounds characterized by the formula:

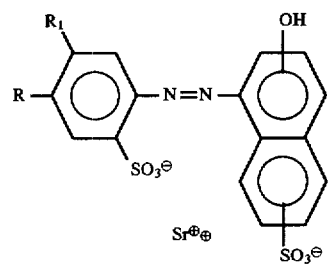

wherein R and $R_1$ are independently hydrogen, chloro, methyl or ethyl groups.

In another embodiment, this invention relates to a process for preparing azo pigments which comprises 1) preparing an azo dye composition by a process comprising coupling (I) at least one diazonium component of one or more aromatic amines characterized by the formula:

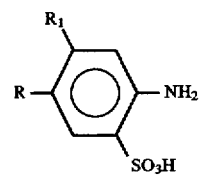

wherein R and $R_1$ are independently hydrogen, chloro, methyl or ethyl groups with (ii) at least one hydroxynaphthalenesulfonic acid coupling component;

2) metallizing at least a portion of said azo dye with one or more strontium metal salts to Form a slurry of azo pigment; and 3) recovering at least a portion of said pigment.

In still another embodiment, this invention relates to azo red pigment compositions prepared by the foregoing process.

In one other embodiment, this invention relates to paint, plastic and ink compositions containing the azo pigment compositions of this invention.

DESCRIPTION OF THE PREFERRED EMBODIMENTS

As previously stated, this invention provides azo pigments and processes for their preparation. The azo pigments of the present invention are prepared by initially diazotizing one or more aromatic amines suitable for use in this invention and thereafter coupling the diazonium component with a coupling component suitable for use in this invention to form the desired dye.

Aromatic amines suitable for the purposes of the present invention are those characterized by the formula:

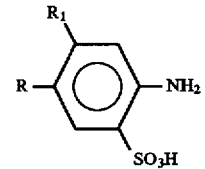

wherein R and $R_1$ are independently hydrogen, chloro, methyl or ethyl groups.

Examples of aromatic amines are 2-amino-4-chloro-5-methylbenzenesulfonic acid, 2-amino-5-chloro-4- methylbenzenesulfonic acid, 2-amino-5-chloro-4-ethylbenzenesulfonic acid, and 2-amino-5-methylbenzenesulfonic acid.

Mixtures of two or more aromatic amines are within the scope of this invention.

The diazotization of the aromatic amines may be carried out in the manners known to those skilled in the art through the use of alkali metal nitrites or lower alkyl nitrites together with an adequately strong acid such as a mineral acid. Examples of useful mineral acid include hydrochloric acid and sulfuric acid. Nitrosyl sulfuric acid can also be utilized. The diazotization reaction can be conducted at a temperature in the range of from about −20° to +30° C., preferably from 0° to 15° C. Although not required, it may be advantageous in some of the diazotization reactions (and in the subsequent coupling reactions) to include a surface-active agent such as a non-ionic, anionic or cationic surface active agent and, optionally, appropriate organic solvents such as, for example, glacial acetic acid, lower alkanols, dioxane, formamide, dimethyl formamide, dimethyl sulfoxide, pyridine or N-methyl pyrrolidone.

The hydroxynaphthalenesulfonic acid couplers useful for the purposes of this invention are represented by the formula:

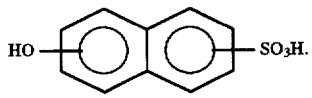

Examples of the hydroxynaphthalenesulfonic acid couplers useful for the purposes of this invention include 1-naphthol-4-sulfonic acid, 1-hydroxynaphthalene-4-sulfonic acid, 1-hydroxynaphthalene-5-sulfonic acid, 1-hydroxynaphthalene-8-sulfonic acid, 2-hydroxynaphthalene-6-sulfonic acid, etc.

Mixtures of two or more of any of the hydroxynaphthalenesulfonic acid couplers are within the scope of this invention.

The coupling reaction useful for the purposes of the present invention may be effected preferably by adding the diazonium components to coupling components, but the coupling components can be added to the diazonium components. Coupling is generally effected at a temperature of from about −20° to about 80° C., preferably from about 0° to about 60° C. and at a pH of from 4 to 12, preferably from about 5 to 11. As in a diazotization reaction, coupling may be carried out in the presence of an appropriate surface active agent or organic solvent, such as all of those identified above for the diazotization reaction.

In one embodiment, the coupling component is dissolved in a basic solution such as an aqueous alkali metal hydroxide solution and reprecipitated with a dilute acid such as acetic acid.

In another embodiment, generally, the diazonium component is coupled with a slight stoichiometric excess of the coupling component. That is, one equivalent of the diazonium component is coupled with slightly more than one equivalent of the coupling component.

In still another embodiment of the present invention, the dispersibility of the pigments of the present invention can be improved by adding alkali-soluble resin-like products before, during, or after the coupling is completed or after the metallization discussed below. Various resin-like materials can be added for this purpose, and these include for example, rosin resins, polymeric rosins, resin soap, chemically modified rosin resins such as rosin-maleinate resins, alkyd resins, and other synthetic hydrocarbon resins with a higher acid number, or combination of these resins. The resins may be present in a product with free carboxyl groups that are capable of forming a salt, or may be partially or completely in the form of salts, for example, with alkali metal ions. It may also be advantageous to perform the coupling reaction in the presence of a finely divided insoluble material, for example, alkaline earth metal sulphates and carbonates, titanium dioxide or clay materials or very finely divided organic plastic materials.

The composition prepared by the above-described coupling reaction can be metallized by one or more strontium salts which form the sulfonate salt. This is also known as laking and forms the azo pigment. $SrCl_2$ and $SrNO_3$ are particularly useful for this purpose. Metallization may be accomplished preferably by adding the strontium salt to the dye after coupling of all the diazonium component present is complete or, by including the strontium salt in the diazonium component whereby metallization occurs as the dye is formed.

In most applications, it is desirable, in order to achieve the full brightness and tinctorial strength, to heat the azo pigment. For example, the product of the metallization may be heated to reflux temperature for about 1 to 3 hours or at temperatures above 100° C. under pressure in the presence of the above-described resin soaps or other soluble resins.

After completion of the metallization, the azo pigments are recovered from the water-based reaction slurry by filtering to form a presscake of pigment which is washed with water so as to remove the excess acids, bases and salts formed in the coupling reaction. The presscake is typically washed with from about 10 to 20 times its volume of water. The filter cake is generally washed until the filtrate gives only a slightly positive test for chloride ion. The washed presscakes can be dried, ground and used in the form of a coarse or finely divided powder. Alternatively, the azo pigments of this invention can be dispersed into oleoresinous vehicles to prepare flushed bases or dispersed into aqueous vehicles to prepare aqueous dispersions.

The pigment compositions of this invention provide improved color strength, resistance to polar solvent, light fastness and/or heat stability and are useful as coloring agents in plastics, paints and inks.

This invention, therefore, also relates to paint, ink and plastic compositions comprising major amounts of a paint vehicle, ink vehicle or plastic and minor amounts of the compositions of this invention.

The paint, ink and plastic compositions in which the compositions of this invention are useful are well known to those of ordinary skill in the art. Examples include printing inks, lacquers, thermoplastic and thermosetting materials, natural resins and synthetic resins, polystyrene and its mixed polymers, polyolefins, in particular polyethylene and polypropylene, polyacrylic compounds, polyvinyl compounds, for example polyvinyl chloride and polyvinyl acetate, polyesters and rubber, and also filaments made of viscose and cellulose ethers, cellulose esters, polyamides, polyurethanes, polyesters, for example polyglycol terephthalates, and polyacrylonitrile. It is also useful for pigment printing and for the pigmenting of paper in the mass.

Due to its excellent heat resistance, the pigment is particularly suitable for the pigmenting of plastics in the mass, such as, for example, of polystyrene and its mixed polymers, polyolefins, in particular polyethylene and polypropylene and the corresponding mixed polymers, polyvinyl chloride and polyesters in particular polyethylene glycol terephthalate and polybutylene terephthalate and the corresponding mixed condensation products based on polyesters.

See, for example, with regard to ink: R. H. Leach, editor, *The Printing Ink Manual*, Fourth Edition, Van Nostrand Reinhold (International) Co.Ltd., London (1988), particularly pages 282–591; with regard to paints: C. H. Hare, *Protective Coatings*, Technology Publishing Co., Pittsburgh (1994), particularly pages 63–288; and with regard to plastics: T. G. Webber, *Coloring of Plastics*, John Wiley & Sons, New York (1979), particularly pages 79–204. The foregoing references are hereby incorporated by reference herein for their teachings of ink, paint and plastic compositions, formulations and vehicles in which the compositions of this invention may be used including amounts of colorants. For example, the pigment may be used at a level of 10 to 15% in an offset lithographic ink, with the remainder being a vehicle containing gelled and ungelled hydrocarbon resins, alkyd resins, wax compounds and aliphatic solvent. The pigment may also be used, for example, at a level of 1 to 10% in an interior paint formulation along with other pigments which could include titanium dioxide, acrylic lactices, coalescing agents, water or solvents. The pigment may also be used, for example, at a level of 20 to 30% in a plastic color concentrate in polyethylene.

The following examples illustrate the compositions of the present invention and their methods of preparation. Unless otherwise indicated in the following examples and elsewhere in the specification and claims, all parts and percentages are by weight, temperatures are in degrees centigrade and pressures are at or near atmospheric.

EXAMPLE 1

A diazo slurry is prepared by dissolving 8.1 parts of 2-amino-4-chloro-5-methylbenzenesulfonic acid in 250 parts of water and 3.3 parts of 50% sodium hydroxide solution. The solution is cooled to 0° C. by the addition of ice and diazotized by the addition of 10.5 parts of a 25% solution of sodium nitrite and 11 parts of 200 Baume hydrochloric acid and stirring the slurry at 0°–10° C. for 30 minutes. Excess nitrite is quenched with sulfamic acid. A small amount of antifoam is used to control the foam.

A coupler slurry is prepared by dissolving 10 parts of potassium salt of 2-hydroxy-naphthalene-6-sulfonic acid (Schaeffer's Salt) by heating in 200 parts of water and 3 parts of 50% sodium hydroxide and cooled to 20° C. with ice.

The diazo slurry is coupled into the coupler slurry over a period of 10–15 minutes. The pH of the slurry is raised to between 9.8 and 10 by addition of 10 percent solution of sodium hydroxide. The mixture is stirred 40 minutes and heated at a rate of approximately 1° C./minute. Forty parts of a 30% solution of strontium nitrate are added over a period of approximately 30 minutes while the temperature of the batch is held at between 45° and 50° C. The slurry is then heated to boil and boiled for 25 minutes. The slurry is then iced to lower than 45° C. and filtered; the filtercake is washed with water, dried overnight at 70° C. and pulverized to give a red pigment powder.

EXAMPLE 2

The procedure of Example 1 is repeated, except that 2-amino-5-chloro-4-methylbenzenesulfonic acid is used in place of 2-amino-4-chloro-5-methylbenzenesulfonic acid, to give an orange pigment.

EXAMPLE 3

The procedure of Example 1 is repeated, except that 6.8 parts of 2-amino-5-methylbenzenesulfonic acid are used in place of 8.1 parts of 2-amino-4-chloro-5-methylbenzenesulfonic acid.

EXAMPLE 4

The procedure of Example 1 is repeated, except that 8.6 parts of 2-amino-5-chloro-4-ethylbenzenesulfonic acid are used in place of 8.1 parts of 2-amino-4-chloro-5-methylbenzenesulfonic acid, to give a red pigment.

EXAMPLE 5

The procedure of Example 1 is repeated, except that a mixture of 4.05 parts of 2-amino-4-chloro-5-methylbenzenesulfonic acid and 4.05 parts of 2-amino-5-chloro-4-methylbenzenesulfonic acid are used in place of 8.1 parts of 2-amino-4-chloro-5-methylbenzenesulfonic acid, to give a red pigment.

EXAMPLE 6

The procedure of Example 1 is repeated, except that a mixture of 4.05 parts of 2-amino-4-chloro-5-methylbenzenesulfonic acid and 4.3 parts of 2-amino-5-chloro-4-ethylbenzenesulfonic acid are used in place of 8.1 parts of 2-amino-4-chloro-5-methylbenzenesulfonic acid, to give a red pigment.

EXAMPLE 7

The procedure of Example 1 is repeated, except that a mixture of 4.05 parts of 2-amino-5-chloro-4-methylbenzenesulfonic acid and 4.3 parts of 2-amino-5-chloro-4-ethylbenzenesulfonic acid are used in place of 8.1 parts of 2-amino-4-chloro-5-methylbenzenesulfonic acid, to give a red pigment.

EXAMPLE 8

The procedure of Example 1 is repeated, except that a mixture of 4.3 parts of 2-amino-5-chloro-4-ethylbenzenesulfonic acid and 3.4 parts of 2-amino-5-methylbenzenesulfonic acid are used in place of 8.1 parts of 2-amino-4-chloro-5-methylbenzenesulfonic acid, to give a red pigment.

TEST METHOD

A mixture of 0.5 part pigment, 0.5 part titanium dioxide (DuPont Ti-Pure® R -960) and 500 parts high density polyethylene (Solvay FORTIFLEX® T50-2000-G) is shaken on a paint shaker to uniformity, then injection molded at 232° C. in a 30 ton Battenfield machine. Spectrophotometric values are measured with a Macbeth Color-Eye (specular component included, large area) to give the apparent strength and hue angle under Illuminant D, 10, and shown in the following table:

TABLE

| Pigment | Apparent Strength (K/S) | Hue Angle |
| --- | --- | --- |
| Example 1 | 33.6 | 26.9 |
| Example 2 | 30.8 | 31.7 |
| Example 3 | 27.4 | 22.2 |
| Example 4 | 37.6 | 23.3 |
| Example 5 | 33.0 | 21.8 |
| Example 6 | 33.4 | 26.0 |
| Example 7 | 40.8 | 25.8 |
| Example 8 | 38.9 | 24.6 |
| PR 254 | 51.1 | 25.1 |
| PR 255 | 45.6 | 31.0 |

What is claimed is:

1. A plastic composition comprising a plastic material and a pigment composition comprising one or more compounds characterized by the formula:

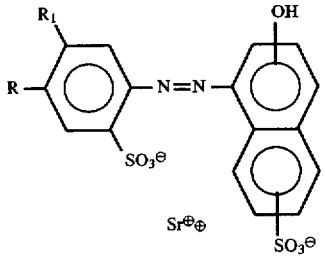

wherein R and $R_1$ are independently hydrogen, chloro, methyl or ethyl groups.

2. A plastic composition comprising a plastic material and a composition prepared according to the process which comprises 1) preparing an azo dye composition by a process comprising coupling (I) at least one diazonium component of one or more aromatic amines characterized by the formula:

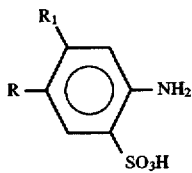

wherein R and $R_1$ are independently hydrogen, chloro, methyl or ethyl groups with (ii) at least one hydroxynaphthalenesulfonic acid coupling component;

2) metallizing at least a portion of said azo dye with one or more strontium metal salts to form a slurry of azo pigment; and 3) recovering at least a portion of said pigment.

3. A paint composition comprising a paint vehicle and a pigment composition comprising one or more compounds characterized by the formula:

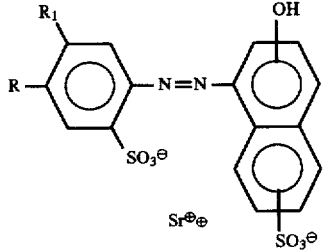

wherein R and $R_1$ are independently hydrogen, chloro, methyl or ethyl groups.

4. A paint composition comprising a paint vehicle and a composition prepared according to the process which comprises 1) preparing an azo dye composition by a process comprising coupling (I) at least one diazonium component of one or more aromatic amines characterized by the formula:

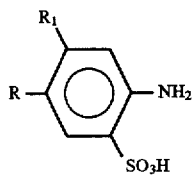

wherein R and $R_1$ are independently hydrogen, chloro, methyl or ethyl groups with (ii) at least one hydroxynaphthalenesulfonic acid coupling component;

2) metallizing at least a portion of said azo dye with one or more strontium metal salts to form a slurry of azo pigment; and 3) recovering at least a portion of said pigment.

5. An ink composition comprising an ink vehicle and a pigment composition comprising one or more compounds characterized by the formula:

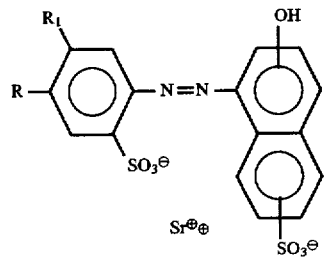

wherein R and $R_1$ are independently hydrogen, chloro, methyl or ethyl groups.

6. An ink composition comprising an ink vehicle and a composition prepared according to the process which comprises 1) preparing an azo dye composition by a process comprising coupling (I) at least one diazonium component of one or more aromatic amines characterized by the formula:

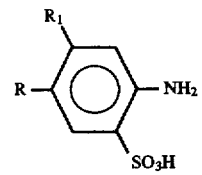

wherein R and $R_1$ are independently hydrogen, chloro, methyl or ethyl groups with (ii) at least one hydroxynaphthalenesulfonic acid coupling component;

2) metallizing at least a portion of said azo dye with one or more strontium metal salts to form a slurry of azo pigment; and 3) recovering at least a portion of said pigment.

7. A composition according to any one of claims 1–6 wherein R is a methyl group and $R_1$ is hydrogen.

8. A composition according to any one of claims 1–6 wherein R is methyl group and $R_1$ is chloro group.

9. A composition according to any one of claims 1–6 wherein R is a chloro group and $R_1$ is a methyl group.

10. A composition according to any one of claims 1–6 wherein R is a chloro group and $R_1$ is ethyl group.

11. A composition according to any one of claims 2, 4 or 6 wherein at least one of said hydroxynaphthalenesulfonic acid coupling component is 2-hydroxynaphalene-6-sulfonic acid.

12. A composition according to any one of claims 1, 3 or 5 wherein said pigment composition comprises one or more compounds characterized by the formula:

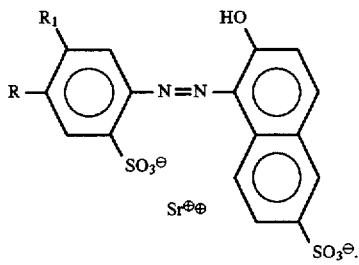

wherein R and $R_1$ are independently hydrogen, chloro, methyl or ethyl groups.

13. A composition according to any one of claims 1, 3 or 5 wherein said pigment composition is represented by the formula:

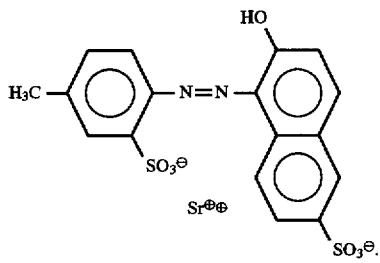

14. A composition according to any one of claims 1, 3 or 5 wherein said pigment composition is represented by the formula:

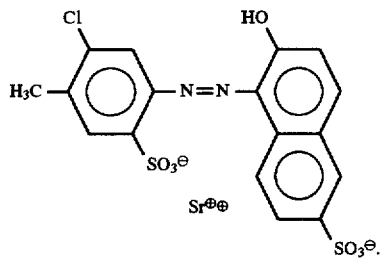

15. A composition according to any one of claims 1, 3 or 5 wherein said pigment composition is represented by the formula:

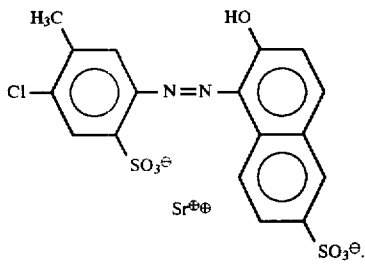

16. A composition according to any one of claims 1, 3 or 5 wherein said pigment composition is represented by the formula:

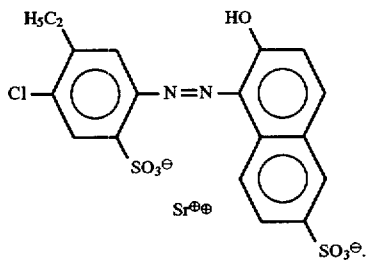

17. A composition according to any one of claims 2, 4 or 6 wherein the diazonium component is a mixture of 2-amino-4-chloro-5-methylbenzenesulfonic acid and 2-amino-5-chloro-4-methylbenzenesulfonic acid.

18. A composition according to any one of claims 2, 4 or 6 wherein the diazonium component is a mixture of 2-amino-4-chloro-5-methylbenzenesulfonic acid and 2-amino-5-chloro-4-ethylbenzenesulfonic acid.

19. A composition according to any one of claims 2, 4 or 6 wherein the diazonium component is a mixture of 2-amino-5-chloro-4-methylbenzenesulfonic acid and 2-amino-5-chloro-4-ethylbenzenesulfonic acid.

20. A composition according to any one of claims 2, 4 or 6 wherein the diazonium component is a mixture of 2-amino-5-chloro-4-ethylbenzenesulfonic acid and 2-amino-4-methylbenzenesulfonic acid.

* * * * *